United States Patent
Shibata et al.

(10) Patent No.: US 8,726,087 B2
(45) Date of Patent: May 13, 2014

(54) SYSTEM AND METHOD FOR CURING A READ INABILITY STATE IN A MEMORY DEVICE

(75) Inventors: Hiroaki Shibata, Novi, MI (US); Koji Shinoda, Farmington Hills, MI (US); Wan-ping Yang, Farmington Hills, MI (US)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 370 days.

(21) Appl. No.: 13/051,555

(22) Filed: Mar. 18, 2011

(65) Prior Publication Data
US 2012/0239972 A1    Sep. 20, 2012

(51) Int. Cl.
G06F 11/00    (2006.01)

(52) U.S. Cl.
USPC .............. 714/36; 714/15; 713/1; 713/2

(58) Field of Classification Search
USPC ................. 714/15, 36; 713/1, 2
See application file for complete search history.

(56) References Cited

U.S. PATENT DOCUMENTS

| | | | |
|---|---|---|---|
| 7,009,896 B2 * | 3/2006 | Yoon et al. | 365/200 |
| 2005/0060528 A1 * | 3/2005 | Kim | 713/1 |
| 2005/0198485 A1 * | 9/2005 | Nguyen et al. | 713/1 |
| 2008/0008001 A1 | 1/2008 | Kuroyanagi | |
| 2008/0046637 A1 | 2/2008 | Katano et al. | |
| 2010/0293323 A1 * | 11/2010 | Jeon et al. | 711/103 |
| 2011/0066837 A1 * | 3/2011 | Lee et al. | 713/2 |
| 2011/0066920 A1 * | 3/2011 | Yu et al. | 714/758 |
| 2012/0054475 A1 * | 3/2012 | Lee | 713/1 |

FOREIGN PATENT DOCUMENTS

| | | |
|---|---|---|
| JP | 2005-215824 | 8/2005 |
| JP | 2007-304781 | 11/2007 |

* cited by examiner

*Primary Examiner* — Charles Ehne
(74) *Attorney, Agent, or Firm* — Harness, Dickey & Pierce, P.L.C.

(57) ABSTRACT

A system and method for correcting a boot error is disclosed. The system comprises a solid-state nonvolatile memory device, the solid-state nonvolatile memory device storing a boot loader at a predetermined block having a first address on the solid-state nonvolatile memory device. The system further comprises a main controller that retrieves the boot loader from the predetermined block upon powering up. The system also includes a monitoring module configured to monitor an initial boot sequence of the main controller and to determine when the predetermined block has a read inability error. The main controller obtains a backup boot loader from a backup block when the monitoring module determines that the predetermined block is corrupted.

20 Claims, 5 Drawing Sheets

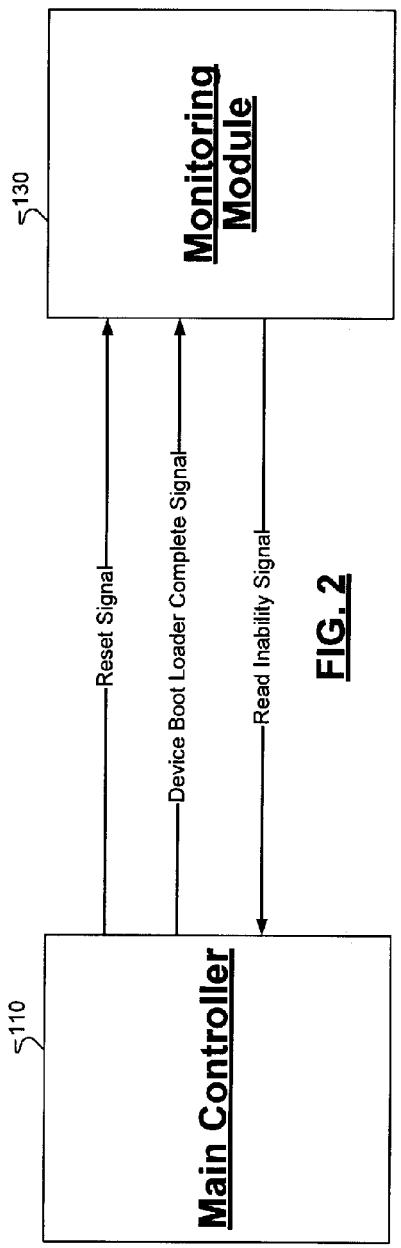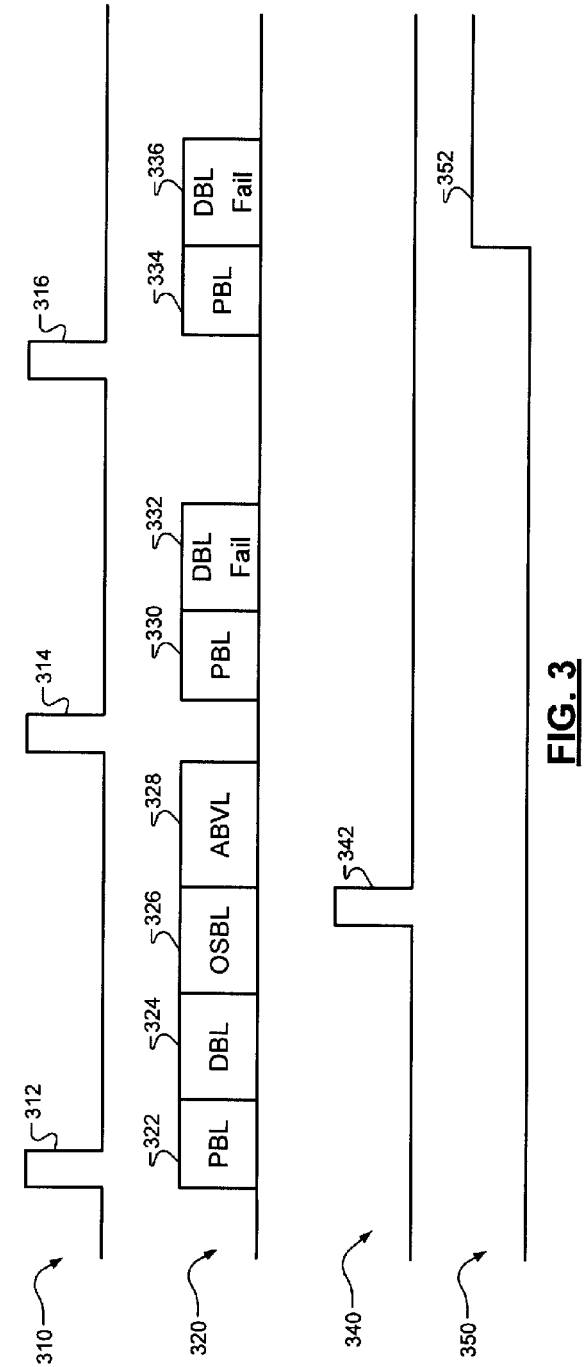

SYSTEM AND METHOD FOR CURING A READ INABILITY STATE IN A MEMORY DEVICE

FIELD

The present disclosure is directed to a method and system for curing a read inability state in a memory device.

BACKGROUND

When a device, such as a telematics device or mobile telephone, is powered on, the processor of the device may need to execute a series of instructions to load the operating system of the device. To initiate the load, the processor will execute a boot sequence, which includes the initial set of instructions or operations that the processor performs when the device is powered on. The initial set of instructions or operations, however, must also be loaded onto the processor. Thus, the processor is typically programmed to automatically retrieve an initial data block containing a set of instructions or operations from a predetermined address in memory. The initial set of instructions or operations are referred to as a boot loader. In many devices the accessed memory is a NAND flash memory device.

One issue that arises with NAND flash, is that read inability errors are observed more often in NAND flash memory devices. Three causes of a read inability error are a bad block error, e.g. a block has been physically damaged, a data retention error, and a read disturb error. Of these, only a bad block cannot be cured by a memory refresh operation because the block error is a permanent error. Typically a boot loader includes instructions for handling a read inability error, including a bad block error, when loading the operating system of the device. When a read inability error occurs in the block containing the boot loader, however, the device is rendered inoperable because the boot loader cannot be loaded, and the sequence for loading the operating system from the flash memory device cannot be accurately performed. Thus, there is a need for a method and system to detect and handle a read inability error in the block containing the boot loader of a device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect of the disclosure, a system for correcting a boot error is disclosed. The system comprises a non-volatile solid state memory device, the non-volatile solid state memory device storing a boot loader at a predetermined block having a first address on the non-volatile solid state memory device. The system further comprises a main controller that retrieves the boot loader from the predetermined block upon powering up. The system also includes a monitoring module configured to monitor an initial boot sequence of the main controller and to determine when the predetermined block is in a read disability error state. The main controller obtains a backup boot loader from a backup block when the monitoring module determines that the predetermined block is in a read disability error state.

In another aspect of the disclosure, a method for correcting a boot error observed in a block of a solid-state nonvolatile memory device is disclosed. The method comprises storing a boot loader at a predetermined block having a first address on the solid-state nonvolatile memory device and attempting to retrieve, by a main controller, the boot loader from the predetermined block upon powering up. The method further comprises monitoring an initial boot sequence of the main controller and determining whether the predetermined block is in a read disability error state based on the monitoring of the initial boot sequence. The method further includes obtaining a backup boot loader from a backup block when the initial boot sequence of the predetermined block is corrupted.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a block diagram illustrating exemplary communications between a main controller and a monitoring module; and FIG. 3 is a diagram illustrating the values of various signals as various applications are loaded from memory;

DETAILED DESCRIPTION

Figure 1:
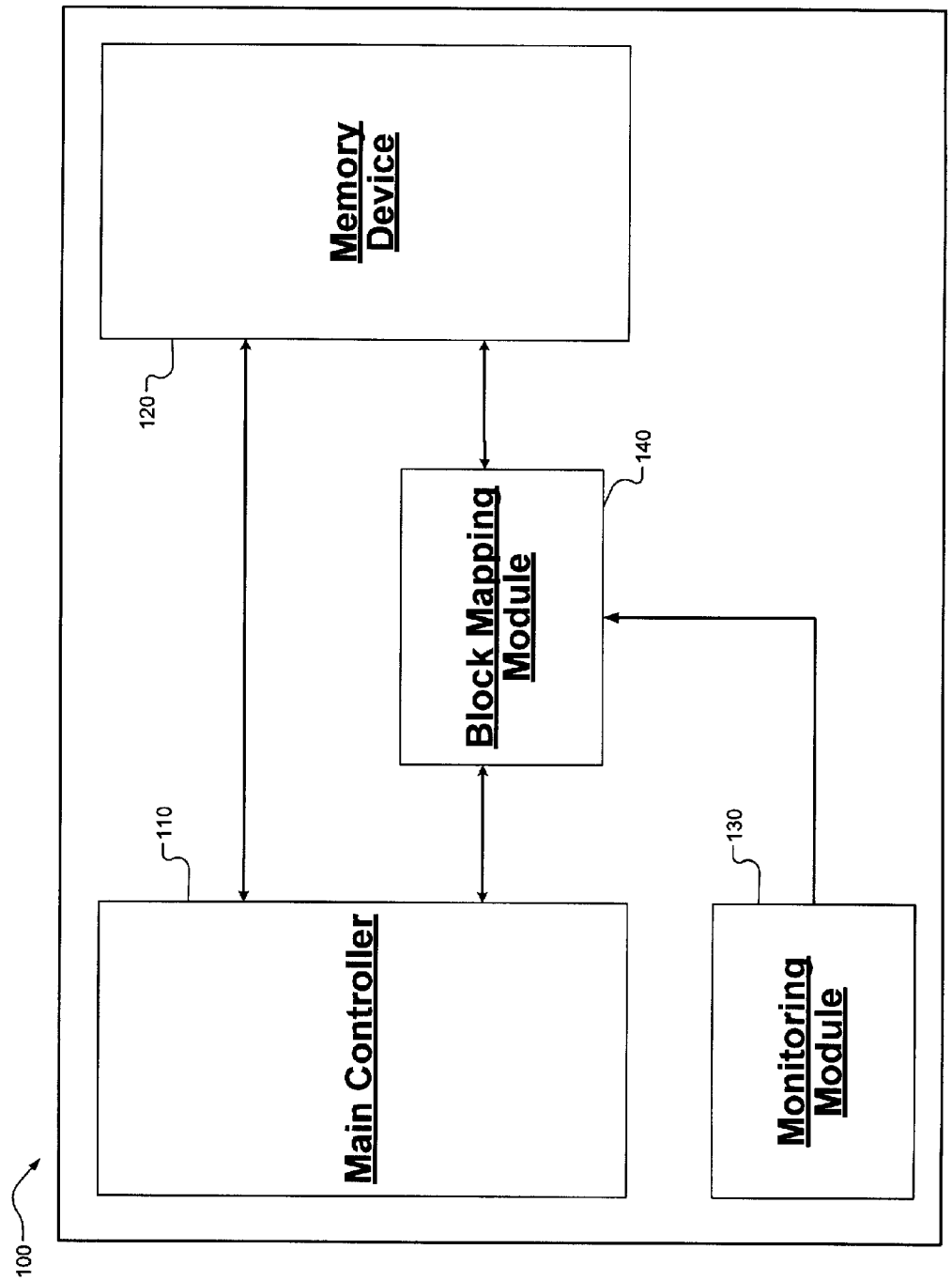
FIG. 1 is a block diagram illustrating the exemplary components of a device.

FIG. 1 illustrates components of an exemplary device 100 or subsystem of a device. The device 100 includes a main controller 110 for operating the device 100, a non-volatile solid state memory device 120 that stores executable instructions for operating the device 100 including a device boot loader for loading the operating system of the device 100, a monitoring module 130 that monitors an initial boot sequence of the main controller 110 to determine if a first block in the non-volatile solid state memory device 120 has been corrupted, and a block mapping module 140 configured to retrieve a backup boot loader from a second block in the non-volatile solid state memory device 120 when the monitoring module 130 determines that the first block is corrupted.

The main controller 110 is comprised of a chip set for performing one or more functions. For example, the main controller 110 may be a microprocessor for controlling a telematics device, a television, or a mobile telephone. To perform the intended function, the main controller 110 may execute an operating system which supports the intended functionality. The operating system is comprised of a set of instructions that need to be accessible to the main controller 110. These instructions are stored on the non-volatile solid state memory device 120.

In some embodiments, the non-volatile solid state memory device 120 is a flash memory device. In some of these embodiments, the flash memory device is comprised of NAND flash memory. It is appreciated, however, that the flash memory device may be comprised of NOR flash memory or later developed technology as well. For purposes of explanation, the solid-state memory device 120 will be referred to as flash memory device 120, but it is appreciated that other types of memory devices now known or later developed may be used as well.

The operating system may further execute specific applications, which can also be stored in the flash memory device 120. Once the operating system is loaded onto the main controller 110, the operating system handles the memory access. Furthermore, the operating system will handle errors relating to memory access errors, such as read inability errors.

Upon powering up, the main controller 110 must load the operating system from the flash memory device 120. Initially, a program referred to as a primary boot loader (PBL) retrieves a program referred to as a device boot loader, or secondary boot loader, from the flash memory device 120. For purposes of clarity, the secondary and device boot loader will be referred to as a device boot loader (DBL). The PBL is pre-programmed on the main controller 110 and executes upon the powering of the main controller 110. The PBL is hard-coded with a predetermined address that indicates a block on the flash memory device 120 where the DBL is stored, e.g. 0x0000. To load the DBL, the PBL requests the block beginning at the predetermined address from the flash memory device 120. The flash memory device 120 returns the block stored at the predetermined address, and the PBL relinquishes control to the DBL, which is stored in the returned block. Once the DBL is loaded, the DBL will instruct the main controller 110 to retrieve the operating system from the flash memory device 120.

As previously mentioned, an issue arises when the block storing the DBL is corrupted. The DBL itself includes code for handling read inability errors, including a bad block error, when loading the operating system. The PBL, however, does not include hard coded instructions for handling different types of read inability errors when loading the DBL. Typically, the PBL can attempt to refresh the memory device 120 and reset the main controller 110 to resolve a detected read inability error. If the block containing the DBL has a bad block error, however, a refresh and reset will not resolve the issue and the device 100 will be rendered inoperable. Furthermore, to prevent bad block errors from occurring, the amount of refresh operations performed on the memory device 120 can be limited.

When a read inability error is detected during the load of the DBL, a copy of the DBL, herein referred to as a backup DBL, is retrieved from an alternative location. The backup DBL may be located at a different location on the flash memory device 120 or may be stored on a separate memory device altogether. In some embodiments, when a first block is determined to be in a read inability state, the block mapping module 140 will map requests from the main controller 110 for a first block at the predetermined address, e.g. the block at 0x0000, to a block at a backup address where the backup DBL is stored, e.g. the block at 0x4000. The block mapping module 140 can be further configured to write a new backup DBL to the flash memory device 120 at a different address, such that if the block beginning at the backup address is ever corrupted, the new backup DBL can be retrieved from the new address.

The device includes a monitoring module 130 to detect read inability errors in the block of the DBL. The monitoring module 130 monitors the boot sequence of the main controller 110 to determine the existence of a read inability error resulting from the corruption of the data block containing the DBL. FIG. 2 illustrates exemplary communications between the main controller 110 and the monitoring module 130. When the main controller 110 is reset, the main controller 110 transmits a reset signal to the monitoring module 130. The main controller 110 transmits a DBL complete signal to the monitoring module 130 when the DBL is successfully loaded from the flash memory device 120 onto the main controller 110. The monitoring module 130 monitors the reset signal and the DBL complete signal to identify a read inability error in the block of the DBL. If a read inability error is detected at the block of the DBL, then the monitoring module 130 transmits a read inability signal to the main controller 130 or the block mapping module 140 (not shown in FIG. 2).

FIG. 3 illustrates an example of the monitoring module 110 identifying a read inability error in the block of the DBL. A signal 310 is the reset signal, whereby a high signal indicates that the main controller 110 has been reset. A sequence 320 is the boot sequence, where the blocks indicate the different applications being loaded to the main controller 110 from the flash memory device 120. A signal 340 is the DBL complete signal whereby a high signal indicates that that the DBL was successfully loaded from the flash memory device 120 to the main controller 110 by the PBL. A signal 350 is the read inability signal, where a high signal indicates that the block storing the DBL is corrupted.

As can be seen from FIG. 3, the main controller 110 initiates a reset at 312. Once the reset is initiated, the PBL 322 begins to execute on the main controller 110. The PBL 322 successfully loads the DBL 324, which in turn loads the operating system 326, which in turn successfully loads an application 328. At a time after the DBL 324 is successfully loaded, the main controller 110 transmits a DBL complete signal 342 to the monitoring module 130. The read inability signal 350 remains low.

The next sequence starts at the next reset 314. The PBL 330 begins to execute and unsuccessfully attempts to load the DBL 332. Upon initially determining that a read error occurred, there is no way to determine if a read inability error occurred because the reset by itself does not include any additional information. Thus, the monitoring module 130 does not transmit a read inability signal at this point. The main controller then resets again at the reset 316. Upon the reset 316, the PBL 334 again unsuccessfully attempts to load the DBL 336. At this point the monitoring circuit 130 has obtained two consecutive reset signals without receiving a DBL complete signal from the main controller 310. When such a sequence occurs, e.g. 2 or more consecutive reset signals without a DBL complete signal, then the monitoring module 130 identifies a read inability error in the block containing the DBL.

It is appreciated that the foregoing is an example of how to determine the existence of a read inability error for the block storing the DBL. It is envisioned that other techniques can be used to determine the existence of a read inability error for the block storing the DBL. It is noted that the foregoing method may be used to identify both temporary and permanent errors. Further, the foregoing may be modified to identify permanent errors from temporary errors by monitoring if a refresh operation was able to cure the read inability error.

Once a read inability error has been detected for the DBL, the main controller 110 must load the backup DBL from an alternate location because the main controller 110 cannot load the DBL from the block in the read inability error state.

Figure 4:
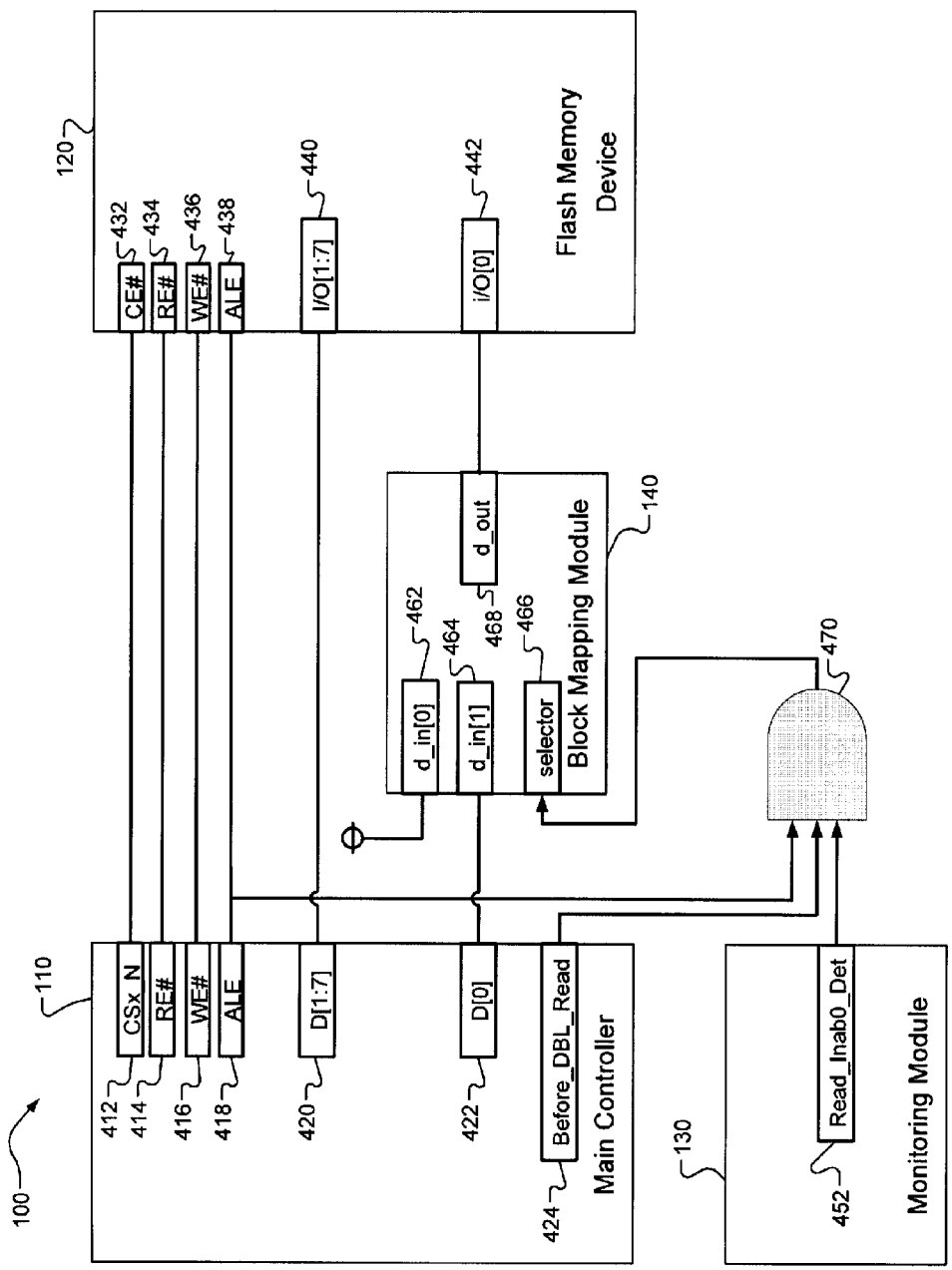
FIG. 4 is a block diagram illustrating an exemplary embodiment of a device having components for identifying and handling a read inability error.

FIG. 4 illustrates an embodiment of a device 100. Device 100 includes the main controller 110, a NAND flash memory device 120, the monitoring module 130 and the block mapping module 140. As was discussed above, the main controller 110, upon powering up, will attempt to load the DBL from a pre-determined location, e.g., the block at beginning address 0X0000. In order to attempt to read the block at the pre-determined address, the main controller 110 will issue a chip enable signal from a pin 412 to a pin 432 in the flash memory device 120 thereby indicating that the flash memory device is to be enabled. The main controller 110 will also issue a read enable signal from a pin 414 to a pin 434, thereby indicating that a read is being requested. When transmitting the address of the block to be read from the flash memory device 120, the main controller 110 will send an address latch enable (ALE) signal from a pin 418 to a pin 438 indicating that the data being communicated corresponds to an address. The address requested by the PBL, e.g. 0x0000, is communicated from a pin 422 to a pin 464 of the block mapping module 140. As will be discussed, the block mapping module 140 will use the received address in the absence of a read inability error. When a read inability error has not been detected, the block mapping module 140 will communicate via a pin 468 the address provided by the PBL executing on the main controller e.g., 0X000, to a pin 442 on the flash memory device 120. The flash memory device 120 will return the block located at the pre-determined address, e.g., the block located at 0X000, to the main controller 110. When a successful read has occurred, the main controller 110 will communicate a DBL complete signal to the monitoring module 130.

If, however, a read inability error is detected with respect to the block storing the DBL, the monitoring module 130 will transmit a read inability detected signal from a pin 452 to an AND gate 470. Furthermore, because the DBL is being loaded from the flash memory device 120, the main controller 110 will transmit a before DBL read signal from a pin 424 to the AND gate 470. The DBL read signal indicates that the DBL has not been loaded from memory yet, but an attempt to do so will occur. Additionally, because an address is being communicated during the attempted DBL load, the address latch enable signal will be on high, which will also be transmitted to the AND gate 470. In this instance, the signals from the pins 418, 424 and 452 will all be high at the AND gate 470, which will result in a high signal being transmitted to a selector pin 466 of the block mapping module 140. When the selector pin 466 receives a high signal, the block mapping module 140 uses a backup address instead of the address provided by the main controller 110.

In the current embodiment, the block mapping module 140 is ordinarily configured to use the address received from the pin 464. If, however, a read inability error is detected at the block storing the DBL, the block mapping module 140 reads a hard coded address from a pin 462. The address stored at the pin 462 is the address of the block storing the backup DBL, e.g., the block starting at 0x4000. When the signal from the AND gate 470 is high, the block mapping module 140 is configured to retrieve the address from pin 462 and to use that address to obtain the back-up DBL from the block located at the backup address. It is noted that the backup DBL can include additional instructions for instructing the main controller 110 to perform a refresh operation on the block containing the read inability error, as the refresh operation will correct temporary errors.

Table I illustrates a truth table that shows the scenario when a backup address is used to retrieve the backup DBL.

TABLE I

| ALE | Read Inability Detected? | Before DBL Read | Change Block? |
|-----|--------------------------|-----------------|---------------|
| L | X | X | NO |
| H | L | L | NO |
| H | L | H | NO |
| H | H | L | NO |
| H | H | H | Yes, Read From Backup Address, Block N |

In Table I an "L" indicates a low signal, an "H" indicates a high signal and an "X" indicates an inconsequential signal. When an "X" is shown, the value obtained from that signal is disregarded or inconsequential. As shown in Table I, the only scenario when the block mapping module 140 will load the backup DBL from the backup address is when the address latch enable signal is high, the read inability detected signal is high, and the before DBL read signal is high.

It is appreciated that the description provided with respect to FIG. 4 is exemplary in nature and that the pins and other components of the main controller 110, the flash memory device 120, the monitoring module 130, and the block mapping module 140 may vary depending on the manufacturers of the various components. Further, while the term pin has been used, it is appreciated that any other input mechanism for communicating signals between components may be used. It is further noted that variations of the foregoing are also within the scope of this embodiment.

Figure 5:
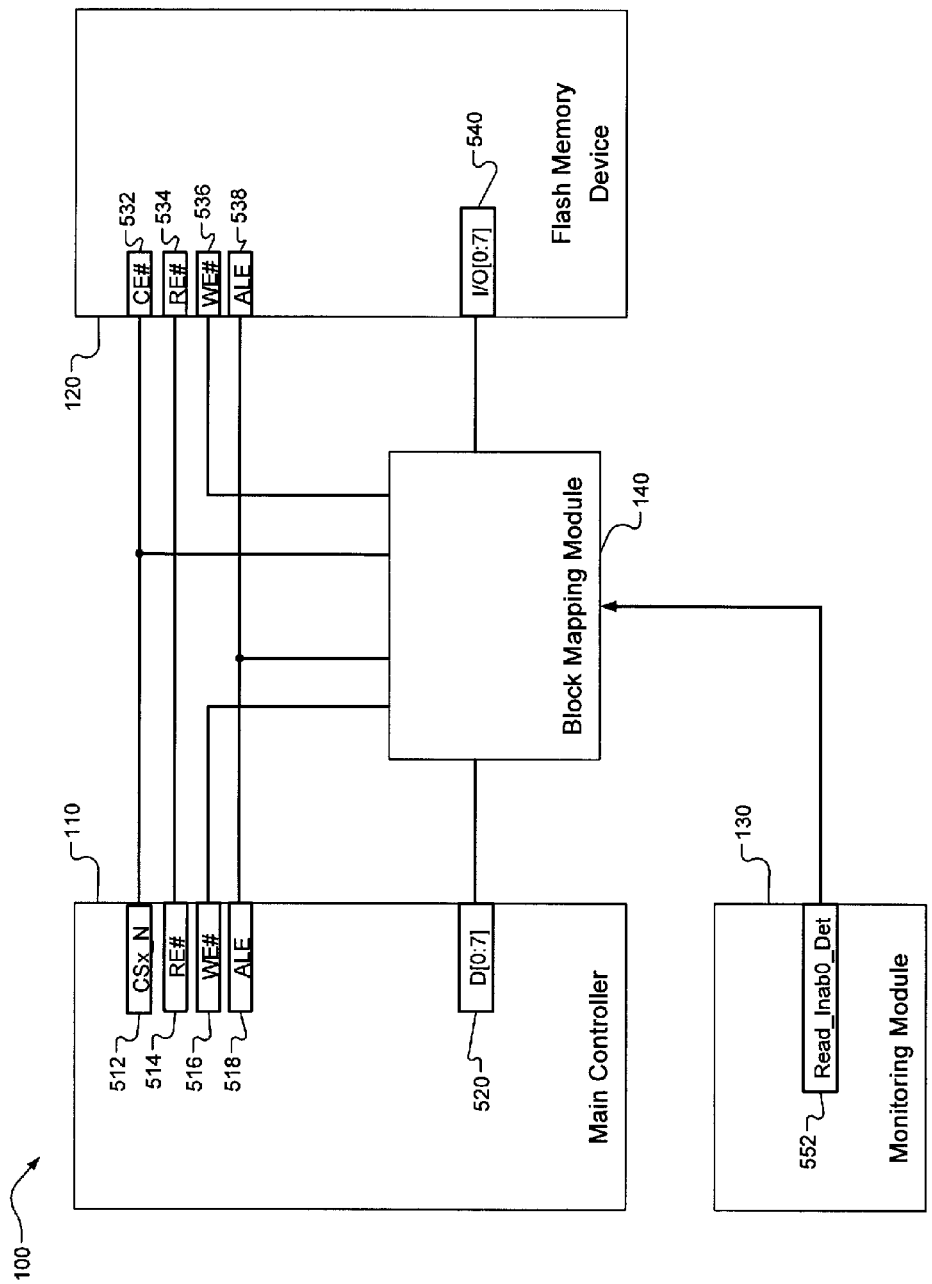
FIG. 5 is a block diagram illustrating an exemplary embodiment of a device having components for identifying and handling a read inability error.

FIG. 5 illustrates an alternative embodiment of the device 100. The device 100 includes the main controller 110, a flash memory device 120, a monitoring module 130, and a block mapping module 140. As was discussed above, the main controller 110, upon being powered up, attempts to retrieve a block containing the DBL from a pre-determined address. The monitoring module 130 will monitor the main controller's 110 attempt to load the DBL from the pre-determined address and determine if the block storing the DBL is in a read inability error state. If so, the monitoring module 130 will signal to the block mapping module 140 the existence of a read inability at the pre-determined address. In such instances, the block mapping module 140 will retrieve the backup DBL from a block located at a backup address when the main controller 110 requests the DBL from the pre-determined address.

When attempting to read from the flash memory device 120, the main controller 110 will transmit a chip enable signal from a pin 512 to a pin 532 indicating to the flash memory that the flash memory device 120 is to be enabled. If the main controller 110 is attempting to read from the flash memory device 120, the main controller 110 will transmit a read enable signal from a pin 514 to a pin 534 thereby indicating that a read is requested. A write enable signal is transmitted from a pin 516 of the main controller 110 to a pin 536 of the flash memory device 120 via the mapping module 140 to indicate that the main controller 110 will write to the flash memory device 120. If an address is being requested, an address latch enable signal will be transmitted from a pin 518 to a pin 538.

When the monitoring module 130 determines that the block storing the DBL has been corrupted, the monitoring module 130 will transmit a read inability signal from a pin 552 to the block mapping module 140. The block mapping module 140 will further monitor the ALE signal, such that when the ALE signal is on and the PBL is attempting to load the DBL from the block in the read inability error state, the block mapping circuit 140 will map a request for the block at the requested address to the block address of the backup DBL. To perform this function, the block mapping module 140 may include a buffer of pre-determined length which can store the block address of the back-up DBL. It is noted that the backup DBL can include additional instructions for instructing the main controller 110 to perform a refresh operation on the block containing the read inability error, as the refresh operation will correct temporary errors. Further, in the case that the block is in a read inability error state, the block mapping module 140 may further be configured to copy the backup boot loader to a new backup address, e.g. 0x8000, such that if the block of the backup DBL becomes corrupted with a read inability error, the block mapping module 140 can retrieve the new backup DBL from the new backup address.

Table II illustrates an exemplary truth table for determining if a backup DBL needs to be loaded.

TABLE II

| ALE | Read Inability Detected | Change Block? |
|---|---|---|
| X | L | NO |
| L | X | NO |
| H | H | Yes, Read From Backup Address, Block N |

In Table II an "L" indicates a low signal, an "H" indicates a high signal and an "X" indicates an inconsequential signal. When an "X" is shown, the value obtained from that signal is disregarded or inconsequential.

It is appreciated that the description provided with respect to FIG. 5 is exemplary in nature and that the pins and other components of the main controller 110, the flash memory device 120, the monitoring module 130 and the block mapping module 140 may vary depending on the manufacturers of the various components. Further, while the term pin has been used, it is appreciated that any other input mechanism for communicating signals between components may be used. It is further noted that variations of the foregoing are also within the scope of this embodiment.

Figure 6:
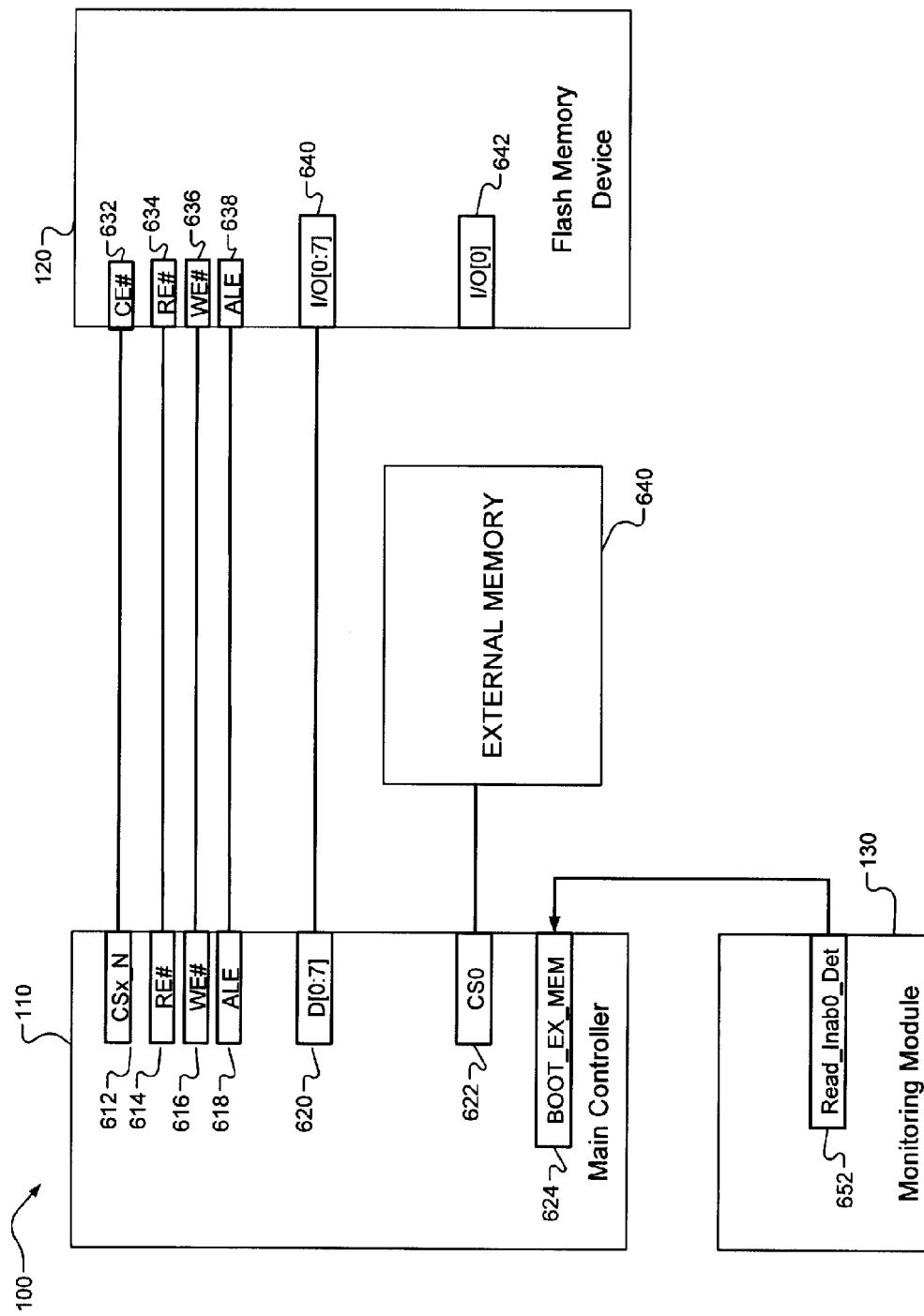
FIG. 6 is a block diagram illustrating an exemplary embodiment of a device having components for identifying and handling a read inability error.

FIG. 6 illustrates an alternative embodiment of the device 100. The device includes a main controller 110, a flash memory device 120, a monitoring module 130 and an external memory device 640. The main controller 110 and the flash memory device 120 operate in a manner similar to the manner described above. In this embodiment, when a read inability error is detected for the block containing the DBL, the monitoring module transmits a read inability detected signal to a pin 624 of the main controller 110. When the signal is received by the main controller 110, the main controller 110 is instructed to boot from the external memory device 640. The external memory 640 contains the backup DBL. Thus when the PBL is attempting to load the memory from the flash memory device 120 and the pin 624 is receiving a read inability signal, the main controller 110 will load the DBL from the external memory device 640. The external memory device 640 may be comprised of ROM or NOR flash memory or other types of memory. It is noted that the backup DBL can include additional instructions for instructing the main controller 110 to perform a refresh operation on the block containing the read inability error, as the refresh operation will correct temporary errors.

Table III illustrated an exemplary truth table for determining when to load the DBL from external memory.

TABLE III

| Read Inability Detected | Boot From |
|---|---|
| L | NAND Flash Memory |
| H | External Memory |

In Table III an "L" indicates a low signal and "H" indicates a high signal.

It is appreciated that the description provided with respect to FIG. 6 is exemplary in nature and that the pins and other components of the main controller 110, the flash memory device 120, the monitoring module 130 and the block mapping module 140 may vary depending on the manufacturers of the various components. Further, while the term pin has been used, it is appreciated that any other input mechanism for communicating signals between components may be used. It is further noted that variations of the foregoing are also within the scope of this embodiment.

The following description is merely illustrative in nature and is in no way intended to limit the disclosure, its application, or uses. For purposes of clarity, the same reference numbers are used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for correcting a boot error comprising:
   a solid-state nonvolatile memory device, the solid-state nonvolatile memory device storing a boot loader at a predetermined block having a first address on the solid-state nonvolatile memory device;
   a main controller that attempts to retrieve the boot loader from the predetermined block upon powering up; and
   a monitoring module configured to monitor an initial boot sequence of the main controller and to determine when the predetermined block is in a read inability error state;
   wherein the main controller obtains a backup boot loader from a backup block when the monitoring module determines that the predetermined block is in a read inability error state, and
   the backup block is located at a second address different than the first address on the solid-state nonvolatile memory device; wherein
   the monitoring module monitors reset signals indicating that the main controller has powered up, boot load complete signals indicating that the boot loader is successfully loaded, and determines that the predetermined block is in a read inability error state when the monitoring modules observe two consecutive reset signals without observing a boot load complete signal.

2. The system of claim 1 further comprising a block mapping module configured to retrieve the backup boot loader from the second address when the main controller requests the boot loader from the first physical address and the monitoring module determines that the predetermined block is in a read inability error state.

3. The system of claim 1 wherein the solid-state nonvolatile memory device is a flash memory device.

4. The system of claim 3 wherein the flash memory device is a NAND flash memory device.

5. A system for correcting a boot error comprising:
   a solid-state nonvolatile memory device, the solid-state nonvolatile memory device storing a boot loader at a predetermined block having a first address on the solid-state nonvolatile memory device;
   a main controller that attempts to retrieve the boot loader from the predetermined block upon powering up; and
   a monitoring module configured to monitor an initial boot sequence of the main controller and to determine when the predetermined block is in a read inability error state;
   wherein the main controller obtains a backup boot loader from a backup block when the monitoring module determines that the predetermined block is in a read inability error state, and
   the backup block is located at a second address different than the first address on the solid-state nonvolatile memory device; wherein
   the backup boot loader includes an instruction to perform a refresh operation on the predetermined block.

6. A method for correcting a boot error observed in a block of a solid-state nonvolatile memory device, comprising:
   storing a boot loader at a predetermined block having a first address on the solid-state nonvolatile memory device;
   attempting to retrieve, by a main controller, the boot loader from the predetermined block upon powering up;
   monitoring an initial boot sequence of the main controller;
   determining whether the predetermined block is in a read inability error state based on the monitoring of the initial boot sequence;
   obtaining a backup boot loader from a backup block when the initial boot sequence of the predetermined block is in the read inability error state;
   storing the backup block at a second address different than the first address on the solid-state nonvolatile memory device; and
   monitoring reset signals indicating that the main controller has powered up and boot load complete signals indicating that the boot loader is successfully loaded, and determining that the predetermined block in the read inability error state when two consecutive reset signals are observed without a boot load complete signal being observed.

7. The method of claim 6 further comprising retrieving the backup boot loader from the second address upon determining that the predetermined block is in the read inability error state.

8. The method of claim 6 wherein the solid-state nonvolatile memory device is a flash memory device.

9. The method of claim 8 wherein the flash memory device is a NAND flash memory device.

10. A method for correcting a boot error observed in a block of a solid-state nonvolatile memory device, comprising:
    storing a boot loader at a predetermined block having a first address on the solid-state nonvolatile memory device;
    attempting to retrieve, by a main controller, the boot loader from the predetermined block upon powering up;
    monitoring an initial boot sequence of the main controller;
    determining whether the predetermined block is in a read inability error state based on the monitoring of the initial boot sequence;
    obtaining a backup boot loader from a backup block when the initial boot sequence of the predetermined block is in the read inability error state;
    storing the backup block at a second address different than the first address on the solid-state nonvolatile memory device; and
    performing a refresh operation on the predetermined block upon determining the predetermined block is in a read inability error state and obtaining the backup boot loader from the backup block.

11. The method of claim 10 wherein the backup boot loader contains an instruction to perform a refresh operation on the predetermined block.

12. A system for correcting a boot error comprising:
    a solid-state nonvolatile memory device, the solid-state nonvolatile memory device storing a boot loader at a predetermined block having a first address on the solid-state nonvolatile memory device;
    a main controller that attempts to retrieve the boot loader from the predetermined block upon powering up; and
    a monitoring module configured to monitor an initial boot sequence of the main controller and to determine when the predetermined block is in a read inability error state;
    wherein the main controller obtains a backup boot loader from a backup block when the monitoring module determines that the predetermined block is in a read inability error state, and
    the monitoring module monitors reset signals indicating that the main controller has powered up, boot load complete signals indicating that the boot loader is successfully loaded, and determines that the predetermined block is in a read inability error state when the monitoring modules observe two consecutive reset signals without observing a boot load complete signal.

13. The system of claim 12 wherein the backup block is stored on an external memory.

14. The system of claim 13 wherein the monitoring module signals to the main controller to retrieve the backup boot loader from the external memory when the monitoring module detects that the predetermined block on the solid-state nonvolatile memory device is in a read inability error state.

15. A system for correcting a boot error comprising:
a solid-state nonvolatile memory device, the solid-state nonvolatile memory device storing a boot loader at a predetermined block having a first address on the solid-state nonvolatile memory device;
a main controller that attempts to retrieve the boot loader from the predetermined block upon powering up; and
a monitoring module configured to monitor an initial boot sequence of the main controller and to determine when the predetermined block is in a read inability error state;
wherein the main controller obtains a backup boot loader from a backup block when the monitoring module determines that the predetermined block is in a read inability error state, and
the backup boot loader includes an instruction to perform a refresh operation on the predetermined block.

16. A method for correcting a boot error observed in a block of a solid-state nonvolatile memory device, comprising:
storing a boot loader at a predetermined block having a first address on the solid-state nonvolatile memory device;
attempting to retrieve, by a main controller, the boot loader from the predetermined block upon powering up;
monitoring an initial boot sequence of the main controller;
determining whether the predetermined block is in a read inability error state based on the monitoring of the initial boot sequence;
obtaining a backup boot loader from a backup block when the initial boot sequence of the predetermined block is in the read inability error state; and
monitoring reset signals indicating that the main controller has powered up and boot load complete signals indicating that the boot loader is successfully loaded, and determining that the predetermined block in the read inability error state when two consecutive reset signals are observed without a boot load complete signal being observed.

17. The method of claim 16 further comprising storing the backup block on an external memory device.

18. The method of claim 17 further comprising generating a signal indicating that the solid-state nonvolatile memory device is in the read inability error state and retrieving the backup boot loader from the external memory upon receiving the signal.

19. A method for correcting a boot error observed in a block of a solid-state nonvolatile memory device, comprising:
storing a boot loader at a predetermined block having a first address on the solid-state nonvolatile memory device;
attempting to retrieve, by a main controller, the boot loader from the predetermined block upon powering up;
monitoring an initial boot sequence of the main controller;
determining whether the predetermined block is in a read inability error state based on the monitoring of the initial boot sequence;
obtaining a backup boot loader from a backup block when the initial boot sequence of the predetermined block is in the read inability error state; and
performing a refresh operation on the predetermined block upon determining the predetermined block is in a read inability error state and obtaining the backup boot loader from the backup block.

20. The method of claim 19 wherein the backup boot loader contains an instruction to perform a refresh operation on the predetermined block.

* * * * *